US012561642B2

(12) United States Patent
Earp et al.

(10) Patent No.: US 12,561,642 B2
(45) Date of Patent: Feb. 24, 2026

(54) SYSTEM AND METHOD FOR TRACKING INVENTORY ITEMS

(71) Applicant: Darvis Inc., San Francisco, CA (US)

(72) Inventors: Brian Earp, Merrimack, NH (US); Jan-Philipp Mohr, Hamburg (DE); Ingo Nadler, Bad Breisig (DE)

( * ) Notice: Subject to any disclaimer, the term of this patent is extended or adjusted under 35 U.S.C. 154(b) by 390 days.

(21) Appl. No.: 18/043,032

(22) PCT Filed: Aug. 26, 2021

(86) PCT No.: PCT/IB2021/057822
§ 371 (c)(1),
(2) Date: Jul. 18, 2023

(87) PCT Pub. No.: WO2022/043909
PCT Pub. Date: Mar. 3, 2022

(65) Prior Publication Data
US 2023/0359985 A1      Nov. 9, 2023

Related U.S. Application Data

(60) Provisional application No. 63/070,348, filed on Aug. 26, 2020.

(51) Int. Cl.
*G06Q 10/087* (2023.01)
*G06V 10/82* (2022.01)
*G06V 20/80* (2022.01)

(52) U.S. Cl.
CPC ........... *G06Q 10/087* (2013.01); *G06V 10/82* (2022.01); *G06V 20/80* (2022.01)

(58) Field of Classification Search
CPC .. G06Q 10/087; G06Q 10/08; G06Q 10/0833; G06Q 10/00; G06V 10/82; G06V 20/80
See application file for complete search history.

(56) References Cited

U.S. PATENT DOCUMENTS 10,055,853 B1 * 8/2018 Fisher .................... H04N 23/90
10,366,306 B1 * 7/2019 Raghavan ........... G06V 10/751
(Continued)

FOREIGN PATENT DOCUMENTS

CN        210682019 U      6/2020

OTHER PUBLICATIONS

International Preliminary report on Patentability issued for International Patent Application PCT/IB2021/057822, on Mar. 9, 2023, 10 Pages.
(Continued)

*Primary Examiner* — Michael Jared Walker
(74) *Attorney, Agent, or Firm* — RC Trademark Company

(57)        ABSTRACT

Disclosed is a system (100) and method for tracking an inventory item (102, 202, 304) within a facility. The system comprises a unique identification tag (208, 306) for the inventory item and a plurality of cameras (104, 106, 204, 206) positioned within the facility. The unique identification tag is visible in images (302, 308, 312) captured by at least one of the plurality of cameras. An image processor (108) configured to receive at least one image of the inventory item from at least one of the plurality of cameras. The image processor identifies one or more parameters such as a type, a class, a state associated with the inventory item from the at least one image. The image processor further identifies the unique identification tag from the at least one image and identify the inventory item associated with it. The image processor employs at least one of: computer vision, neural networks, image processing algorithms for processing of the image.

11 Claims, 5 Drawing Sheets

(56) References Cited

U.S. PATENT DOCUMENTS

| 10,679,177 | B1 * | 6/2020 | Liberato, Jr. | ........ | G06Q 10/087 |
| 11,042,787 | B1 * | 6/2021 | Kumar | ................ | G06V 10/751 |
| 12,190,280 | B2 * | 1/2025 | Abrahamson | ........... | G07F 9/026 |
| 2017/0046593 | A1 * | 2/2017 | Tapley | .............. | G06Q 30/0623 |
| 2019/0340567 | A1 * | 11/2019 | Long | .................... | G06F 1/1686 |
| 2020/0151692 | A1 * | 5/2020 | Gao | .................... | G07G 1/0063 |
| 2022/0076015 | A1 * | 3/2022 | Lee | ...................... | G06F 18/214 |

OTHER PUBLICATIONS

International Search Report and Written Opinion issued for International Patent Application PCT/IB2021/057822, on Nov. 18, 2021, 13 Pages.

* cited by examiner

100

312

306

RECEIVE AT LEAST ONE IMAGE OF INVENTORY ITEM
402

IDENTIFY ONE OR MORE PARAMETERS ASSOCIATED WITH INVENTORY
ITEM FROM AT LEAST ONE IMAGE
404

IDENTIFY UNIQUE IDENTIFICATION TAG OF INVENTORY ITEM FROM AT
LEAST ONE IMAGE
406

DETERMINE IDENTITY OF INVENTORY ITEM ASSOCIATED WITH
UNIQUE IDENTIFICATION TAG
408

SYSTEM AND METHOD FOR TRACKING INVENTORY ITEMS

TECHNICAL FIELD

The present disclosure relates generally to tracking inventory items; and more specifically, to systems and method for tracking of inventory items within a facility.

BACKGROUND

In the recent past, any sufficiently large facility that houses movable inventory items faces the problems of theft, misplacement or simply messy use of the inventory, so it isn't always found immediately. Consequently, monitoring and tracking of inventory items is a necessity in a wide variety of industries and commercial places. Notably, every manufacturer who stores his goods in a facility, be it a warehouse, factory, or an assembly plant, for any period of time must monitor and track the type and availability of the inventory items in the facility. However, this process is not limited to those who make their own products. For instance, a hospital that uses ECG machines, medical equipment, beds and the like, must have an overview of the beds lying vacant, the number of ECG machines being used and so forth.

Notably, manually tracking and keeping a count of each inventory item is not feasible. Additionally, tracking all inventory items in a facility takes a significant amount of time and labour. Moreover, as manually tracking of inventory is performed by employees, human errors can be introduced. Furthermore, in an example of a hospital environment, it is desired to know how many times a certain bed has been used and cleaned, or where the bed with patient X is currently located. In addition, inventory items, such as wheelchairs or mobile devices such as sonographs or electrocardiographs need to be located quickly or have their use documented.

Typically, solutions exist that make use of radio-frequency identification (RFID) technology and radio-frequency identification readers installed throughout a facility. However, these require each and every inventory item tagged with a radio-frequency identification chip to be sufficiently close to the reader, which is rarely the case. Furthermore, another existing solution makes use of beacons (like Bluetooth low energy), mounted on the inventory item and respective receivers throughout the facility. Consequently, the positions of the inventory items to be tracked are then located. A shortcoming of all this existing technology is that any attached beacons do not convey information about the state of the inventory object. For an example, in a hospital, if a wheelchair is empty or not, if a hospital bed is clean or unclean, and so forth.

Therefore, in light of the foregoing discussion, there exists a need to overcome the aforementioned drawbacks associated with conventional methods of tracking inventory items.

SUMMARY

The present disclosure seeks to provide a system for tracking an inventory item within a facility. The present disclosure also seeks to provide a method of tracking an inventory item within a facility. An aim of the present disclosure is to provide a solution that overcomes at least partially the problems encountered in prior art.

In one aspect, the present disclosure provides a system for tracking an inventory item within a facility, the system comprising a unique identification tag for the inventory item;

a plurality of cameras positioned within the facility;

an image processor configured to, in response to receiving at least one image of the inventory item including the unique identification tag from at least one of the plurality of cameras:

employ at least one of: computer vision, neural networks, image processing algorithms for processing the at least one image to:

identify one or more parameters associated with the inventory item from the at least one image, wherein the one or more parameters include at least one of: a type, a class, a state of the inventory item; and identify the unique identification tag of the inventory item from the at least one image; and determine an identity of the inventory item associated with the unique identification tag.

In another aspect, the present disclosure provides a method of tracking an inventory item within a facility, the method comprising receiving at least one image of the inventory item, wherein the at least one image comprises a unique identification tag therein;

using at least one of: computer vision, neural networks, image processing algorithms for processing the at least one image to:

identify one or more parameters associated with the inventory item from the at least one image, wherein the one or more parameters include at least one of: a type, a class, a state of the inventory item; and identify the unique identification tag of the inventory item from the at least one image; and determining an identity of the inventory item associated with the unique identification tag;

Embodiments of the present disclosure substantially eliminate or at least partially address the aforementioned problems in the prior art, and enable identifying the location and the type of the inventory items in real time. Additionally, the present disclosure further identifies the state and the class of the inventory items present in the facility.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
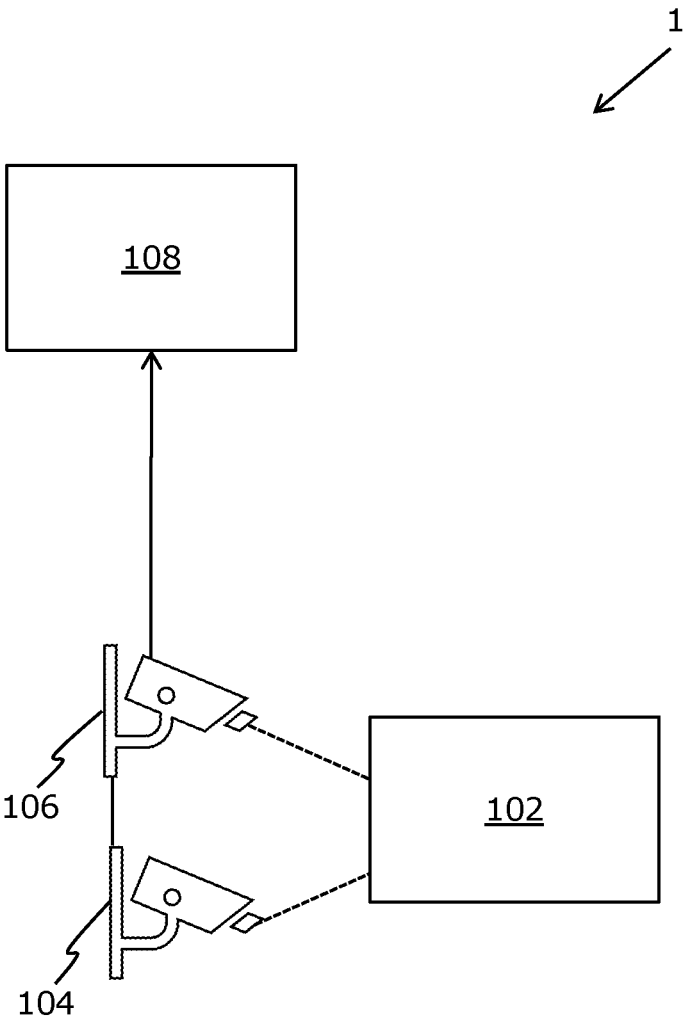
FIG. 1 is a block diagram of a system for tracking an inventory item in facility, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, the present disclosure provides a system for tracking an inventory item within a facility, the system comprising a unique identification tag for the inventory item;

a plurality of cameras positioned within the facility;

an image processor configured to, in response to receiving at least one image of the inventory item including the unique identification tag from at least one of the plurality of cameras:

employ at least one of: computer vision, neural networks, image processing algorithms for processing the at least one image to:

identify one or more parameters associated with the inventory item from the at least one image, wherein the one or more parameters include at least one of: a type, a class, a state of the inventory item; and identify the unique identification tag of the inventory item from the at least one image; and determine an identity of the inventory item associated with the unique identification tag.

In another aspect, the present disclosure provides a method of tracking an inventory item within a facility, the method comprising receiving at least one image of the inventory item, wherein the at least one image comprises a unique identification tag therein;

using at least one of: computer vision, neural networks, image processing algorithms for processing the at least one image to:

identify one or more parameters associated with the inventory item from the at least one image, wherein the one or more parameters include at least one of: a type, a class, a state of the inventory item; and identify the unique identification tag of the inventory item from the at least one image; and determining an identity of the inventory item associated with the unique identification tag.

The system and method of the present disclosure aim to provide tracking for an inventory item within a facility. In some implementations, the present disclosure can identify the location and one or more parameters of the inventory items in real time. Additionally, embodiments of the present disclosure further can identify the type, state and/or the class of the inventory items present in the facility. In some implementations, the present disclosure can also provide for reconstructing the path of each tracked item within the facility. In this way, the system and method can enable the display of a dashboard of all the inventory items and their spatial positions. In some implementations, the system and method can determine a number of times a specific inventory item has undergone a process to be measured. For an example, in a hospital, determining the number of times a bed has been cleaned in the past week.

Pursuant to embodiments of the present disclosure, the system and the method provided herein are for tracking an inventory item within a facility. Herein, "facility" refers to a warehouse, a building that houses inventory items, a commercial space, a hospital, a school and the like. Additionally, other than housing inventory, other industrial activities, such as manufacturing, processing, and the like may be carried out in the facility. Herein, "inventory item" refers to any item such as products, raw materials, work-in-process goods and finished goods that needs to be tracked. Moreover, movable assets and items in the facility could be inventory items as well. Herein, "tracking" refers to locating and identifying, among other things, the inventory items present in the facility.

The system comprises a unique identification tag for the inventory item. Herein, the "unique identification tag" refers to an identification tag that may help in recognizing the inventory item. Additionally, the unique identification tag may be a combination of numbers, a combination of alphabets or any other alphanumeric combination. For each inventory item in the facility, the unique identification tag may be encoded in a visually distinctive and machine-readable pattern. Herein, visually distinctive and machine-readable pattern refers to a pattern that is easily recognizable, readable by a processor in an image captured by a camera and that can be further processed by said processor. In some examples, the visually distinctive and machine-readable pattern may resemble a vehicle license plate, a quick response code (QR code), a colour code or any combination thereof.

Optionally, the unique identification tag may be generated as a random machine-readable pattern. Herein, the unique identification tag is generated by the system randomly for the inventory items to be tracked within the facility. Additionally, the randomly generated unique identification tag may be printed and attached to at least one side of the inventory item in the facility. In some examples, the unique identification tag may contain the type of the inventory item.

The system comprises a plurality of cameras positioned within the facility. The plurality of cameras may be positioned in a manner that the unique identification tag is visible in one or more images captured by at least one of the plurality of cameras. Herein, the plurality of cameras may be installed within the facility in a way that substantially all potential areas for the inventory items to be tracked are covered by at least one camera. Additionally, the cameras may be installed and positioned in such a way that the visually encoded unique tag attached to at least one side of the inventory item is visible to at least one of the plurality of cameras, irrespective of orientation of the inventory item or even when the inventory item is being moved.

The system comprises an image processor. Herein, "image processor" refers to an image processing engine or an image processing unit that can perform quantitative measurements of counts, length, duration, and thus can be used to analyse and process at least one of the images from the plurality of cameras. Additionally, the image processor may comprise software programs for creating and managing one or more processing tasks. For example, the image processor may perform noise reduction, object detection, extraction, and the like. Furthermore, the image processor is communicably coupled to the plurality of cameras in the facility, e.g., via a network. Herein, a network may be a radio network, a local area network (LAN), wide area network (WAN), Personal Area Network (PAN), Wireless Local Area Network (WLAN), Campus Area Network (CAN), Metropolitan Area Network (MAN), storage-Area Network (SAN), and the likes.

The image processor is configured to receive at least one image of the inventory item from at least one of the plurality of cameras, wherein the at least one image may include the unique identification tag therein. Herein, an image or a set of consecutive images may be received from the at least one camera out of the plurality of cameras in the facility via the network. The received image may contain the inventory item to be tracked. Additionally, the side of the inventory item comprising the unique identification tag may be visible in the said received image.

In response to receiving at least one image of the inventory item including the unique identification tag from at least one of the plurality of cameras, the image processor is configured to employ at least one of: computer vision, neural networks, image processing algorithms for processing of at least one image.

Optionally, the image processor may employ neural networks for processing of the at least one image and the image processor may be trained using real images, synthetic images or a combination thereof for identification of one or more parameters associated with the inventory item. Herein, the image processor may be trained using several training data sets of real images, synthetic images and a combination thereof. For example, the images used in the training data sets may be similar to the images of inventory items to be stored in the facility. Different angles, different backgrounds and variable distances of the inventory items may be used to train the image processor. Additionally, algorithms such as You Only Look Once (YOLO) algorithm, MM algorithm may be used for object detection in the neural network of the image processor. Herein, "object" refers to the inventory item in the image.

In response to receiving at least one image of the inventory item including the unique identification tag from at least one of the plurality of cameras, the image processor is configured to identify one or more parameters associated with the inventory item from the at least one image, wherein the one or more parameters include at least one of: a type, a class, a state of the inventory item. Herein, the image processor may process the received image to recognize the presence and position of an inventory item within the image. The image processor may detect the state of an item, the class, the type or any combination of class and possible state, depending on the case. Herein, "state" refers to the actual condition or the situation of an inventory item within the facility. In this regard, for an example, in a hospital, the state of a hospital bed may be empty or occupied. Furthermore, the term "type" and "class" may refer to a predefined category of the inventory item. Such predefined categories may be stored with the image processor Optionally, the image processor may be configured to crop the at least one image to bounding box coordinates of the inventory item therein, prior to identifying the unique identification tag of the inventory item. Herein, bounding box coordinates refers to a box shaped outline around the inventory item in the image. The box shaped outline focuses on the position and presence of the inventory item in the image. In some examples, the image processor may crop the image to the bounding box coordinates. In some examples, cropping the image may remove noise elements present in the image. Herein, noise element refers to unnecessary elements present in the background of the image and around the image.

In response to receiving at least one image of the inventory item including the unique identification tag from at least one of the plurality of cameras, the image processor is further configured to identify the unique identification tag of the inventory item from the at least one image. In some examples, the image processor may be trained to locate the position and identify the unique identification tag in the cropped image. Herein, the image processor identifies and locates the unique identification code in the cropped image. In some examples, the cropped image may focus on the inventory item alone and discard the noise present in the image. As such, the cropped image may be left with less data for the image processing unit to process. In this way, the cropped image can make it easier for the image processor to locate and identify the unique identification tag.

The image processor is configured to determine the identity of the inventory item associated with the unique identification tag. Herein, the image processor may be trained to decode the identified unique identification tag in the cropped image. In some examples, the decoded data from the unique identification tag of the cropped image may be extracted. In some examples, the extracted data may be compared with a database to determine the type of item.

Optionally, the image processor may be communicably coupled with a database for storing information relating to inventory items and corresponding unique identification tags, wherein the image processor is configured to employ the database for determining the identity of a given inventory item associated with a given unique identification tag. Herein, the database records all the information of each inventory items at the time of entry into to the facility. Additionally, the unique identification tag generated by the system may also be recorded corresponding to each inventory item. The information stored in the database may contain the type, kind, availability, date of entry and so forth for each inventory item. In some examples, the unique identification tag received from the image of at least one camera in the facility may be compared with the stored information in the database. In some examples, the information matching the unique identification tag may be extracted from the database and the associated inventory item type may be determined.

Throughout the present disclosure, the term "database" as used herein relates to an organized body of digital information regardless of the manner in which the data or the organized body thereof is represented. Optionally, the database may be hardware, software, firmware and/or any combination thereof. Furthermore, the database may comprise software programs for creating and managing one or more databases. Optionally, the database may be operable to support relational operations, regardless of whether it enforces strict adherence to the relational model, as understood by those of ordinary skill in the art. Additionally, the database may be populated by data elements. Furthermore, the data elements may include data records, bits of data, cells, which are used interchangeably herein and are all intended to mean information stored in cells of a database.

Optionally, the image processor may employ a neural network to determine the identity of an inventory item in at least one image received from the plurality of cameras within the facility. In some examples, the trained neural network may further identify the unique identification tag within the image. The image processor may identify a unique tag identifier or the like in the subset of the received image that contains the identified inventory item. In some examples, a bounding box outline may be created around the inventory item in the received image. In some examples, the inventory item within the boundary box may be enlarged and/or filtered to enhance readability of the unique identification tag. In some examples, the image processor may identify the unique identification tag and decodes the same using at least one algorithm.

In some embodiments, the image processor may be further configured to employ a filter algorithm for collecting data relating to a given unique identification tag from a plurality of consecutive image frames, and extract a legible image of the given unique identification tag therefrom. Herein, a "legible image" refers to a clear enough image to be read easily by the image processor. In some cases, the unique identification tag in the image may be in part or entirely illegible due to a bad read angle from the at least one of the cameras, bad lightning, obscuring through people or other objects, or any other factor. A filter algorithm may be employed to construct at least one legible image frame with the unique identification tag from a plurality of consecutive image frames. Herein, the "consecutive image frames" refer to successive images taken by at least one of the plurality of cameras installed in the facility. In some examples, the filter algorithm employed may be heuristic, Kalman or any other type to extract the unique identification tag from the plurality of consecutive frames. In some examples, the extracted data of the unique identification tag from the filtered image frame may be compared with same class objects in the database. In this regard, in a case where a matching unique identification tag is identified, it can be considered valid. In some examples, the distance of the unique identification tag may be calculated in relation to all unique identification tags of the same object class in the database and the closest distance can be considered to be the valid unique identification tag. In some examples, in a case where the extracted data of the unique identification tag from the filtered image frame does not match with the database, the image frame may be discarded. In some examples, a new image may be considered again.

Optionally, the image processor may be configured to use a homographic matrix for calculating, based on the unique identification tag of the inventory item, a spatial position of the inventory item within the facility. For example, the homographic matrix may be used on the valid image with valid unique identification tag to calculate the spatial position of the inventory item within the facility. Herein, "spatial position" refers to the position or the location of the inventory item being tracked within the facility. In some examples, the bounding box position of the inventory item in the image, the camera that detected the inventory item, the time stamp of the detection and the detected state of the inventory item may be sent to the database for storage.

In this regard, the database may be equipped with the unique identification tag of each of the inventory item to be tracked. In some examples, the database may also be equipped with the time-stamp series data, the spatial positions and the states of the inventory items. Furthermore, the data can keep updating as soon as an inventory item within the facility is moved. In some examples, the data may also be updated after a fixed regular interval or at the time of need.

In some embodiments, the unique identification tag for an inventory item may only need to be identified once using the plurality of cameras within a facility. Subsequently, the identified unique identification tag may be assigned to the inventory item and may be tracked throughout the facility.

In some embodiments, the information of the unique identification tag may be updated in the database in the event that the same unique identification tag is re-identified by a second camera image at a later stage.

In this regard, it will be appreciated that identifying a unique identification tag can be sufficient to locate an inventory item within a facility. In some examples, the detection of inventory item type, class and/or state may be skipped. In some examples, the neural network may be employed in the entire image to locate one or more unique identification tags.

Optionally, the identified unique identification tag and hence the inventory item may be positioned within a two-dimensional map by applying a homographic projection to the centre image coordinates of the unique identification tag. For example, the homographic projection may be applied using a homography matrix derived from defining four points within the image and four corresponding points on a ground map. In some examples, this method can yield a precise position for a known mounting height of the unique identification tag. In some examples, the ground plane of a camera image may be determined, and the position of unique identification tag may be calculated by the intersection of a vertical line from its centre and the ground plane. The resulting image coordinates may be projected onto a ground map using the homographic projection.

It will be appreciated that it is possible to reconstruct the path of each of the tracked inventory item within the facility. Additionally, locating the last known position of an inventory item is possible in-real time. In this regard, a dashboard with all the inventory items and their spatial positions may be displayed. In some examples, one ore more actions may be performed in real time based on the state and location of a specific inventory item within the facility. For an example, in a hospital, open door "A", if an occupied bed "B" gets in front of the door "A". Herein, the inventory item is the bed "B", the state of the inventory item is "occupied" and the action performed is opening door "A".

DETAILED DESCRIPTION OF THE DRAWINGS

Referring to FIG. 1, there is shown a block diagram illustrating system 100 for tracking an inventory item in a facility, in accordance with an embodiment of the present disclosure. The system 100 comprises an inventory item 102, a plurality of cameras, such as the cameras 104, 106 and an image processor 108. The plurality of cameras, such as the cameras 104, 106 are positioned within the system 100 to capture images of the inventory item 102 such that a unique identification tag is visible in the image captured by at least one of the plurality of cameras, such as the camera 104, 106. The images from the plurality of cameras 104, 106 are sent to the image processor 108 for further processing.

Figure 2:
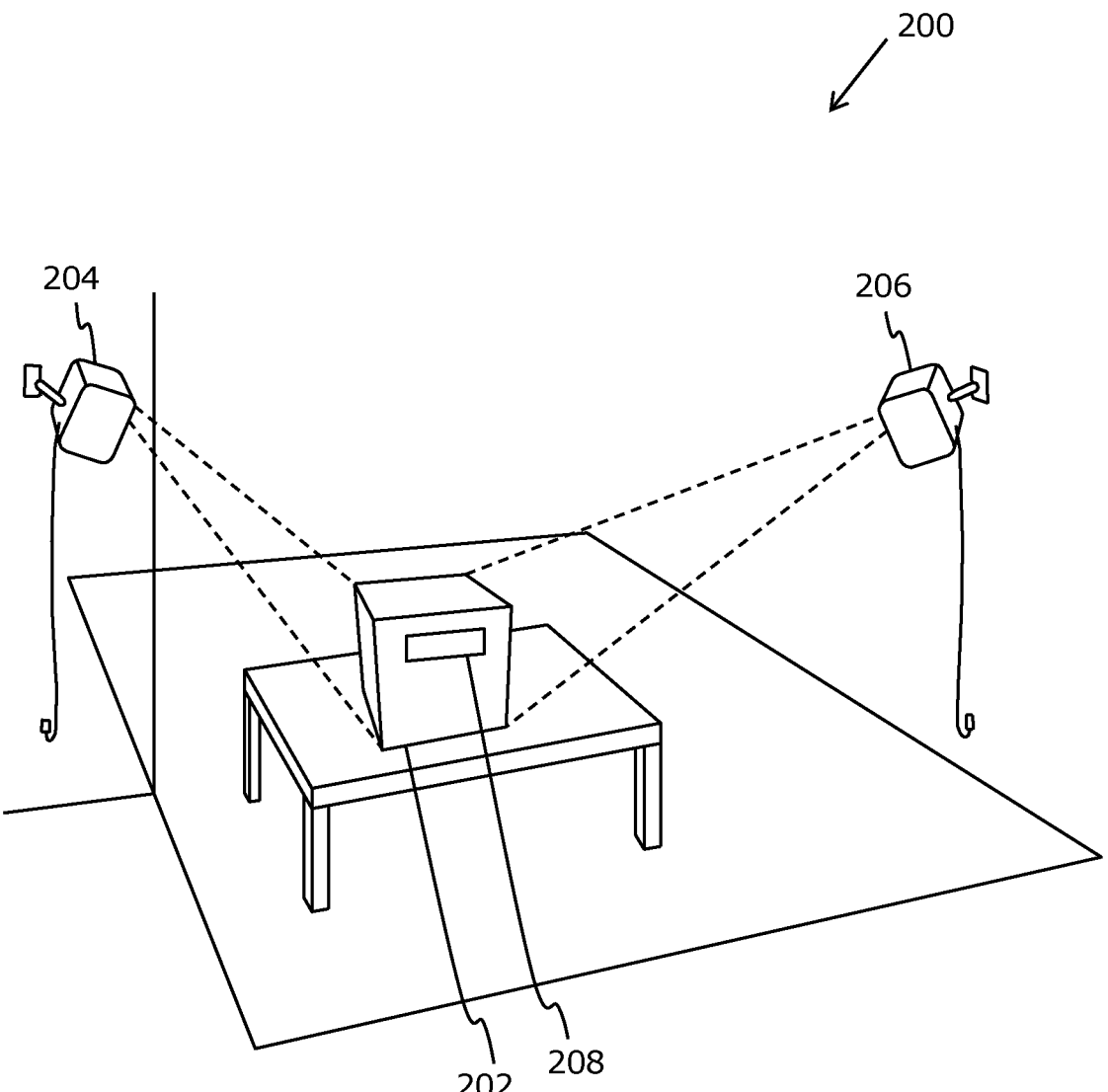
FIG. 2 is an illustration of an environment in which a system for tracking an inventory item is implemented, in accordance with an embodiment of the present disclosure.

Referring to FIG. 2, illustrated is an environment 200 in which a system for tracking an inventory item 202 is implemented, in accordance with an embodiment of the present disclosure. The environment 200 comprises a plurality of cameras, such as cameras 204, 206. Herein, at least one of the plurality of cameras 204, 206 tracks a unique identification tag 208. Hereinafter, the unique identification tag 208 is tracked and the images are sent to an image processor for further processing of the images.

Figure 3A:
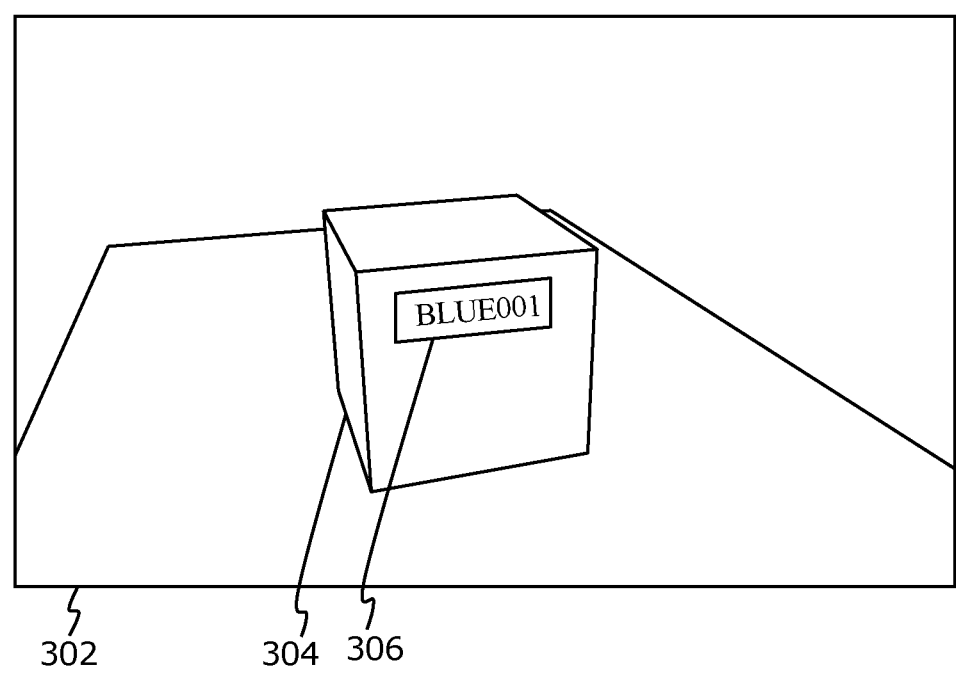
FIGS. 3A-3D illustrate steps of image processing using an image processor, in accordance with an embodiment of the present disclosure.
Figure 3B:
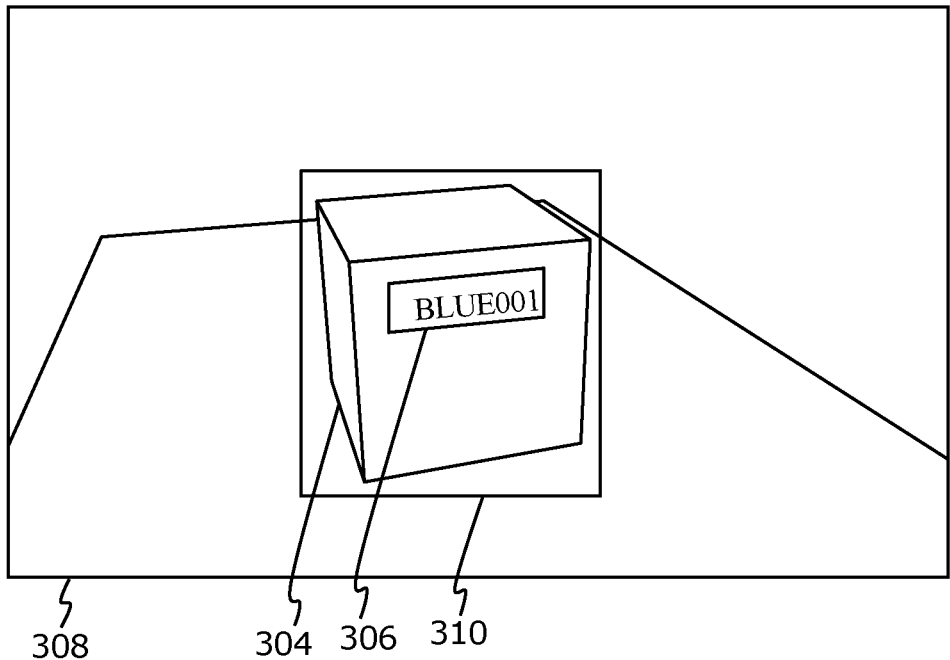
Figure 3C:
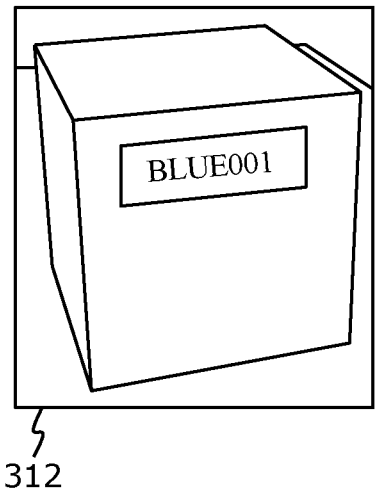
Figure 3D:
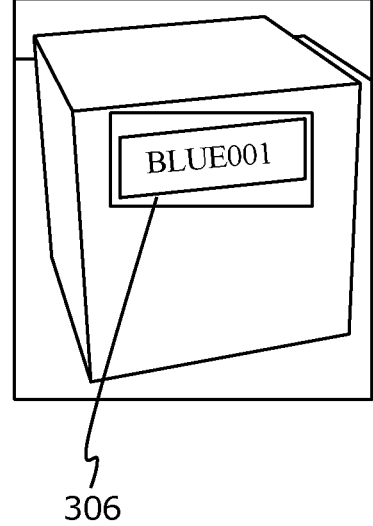

Referring to FIGS. 3A-3D, illustrated is steps of image processing by an image processor, in accordance with an embodiment of the present disclosure. FIG. 3A shows an image 302 of an inventory item 304 comprising a unique identification tag 306 as captured by plurality of cameras which is communicated to the image processor. FIG. 3B shows an image 308 wherein the inventory item 304 comprising the unique identification tag 306 has a bounding box 310 around the inventory item 304. In FIG. 3C, the image 312 is cropped according to the bounding box 310. In FIG. 3D, the image processor identifies the unique identification tag 306.

Figure 4:
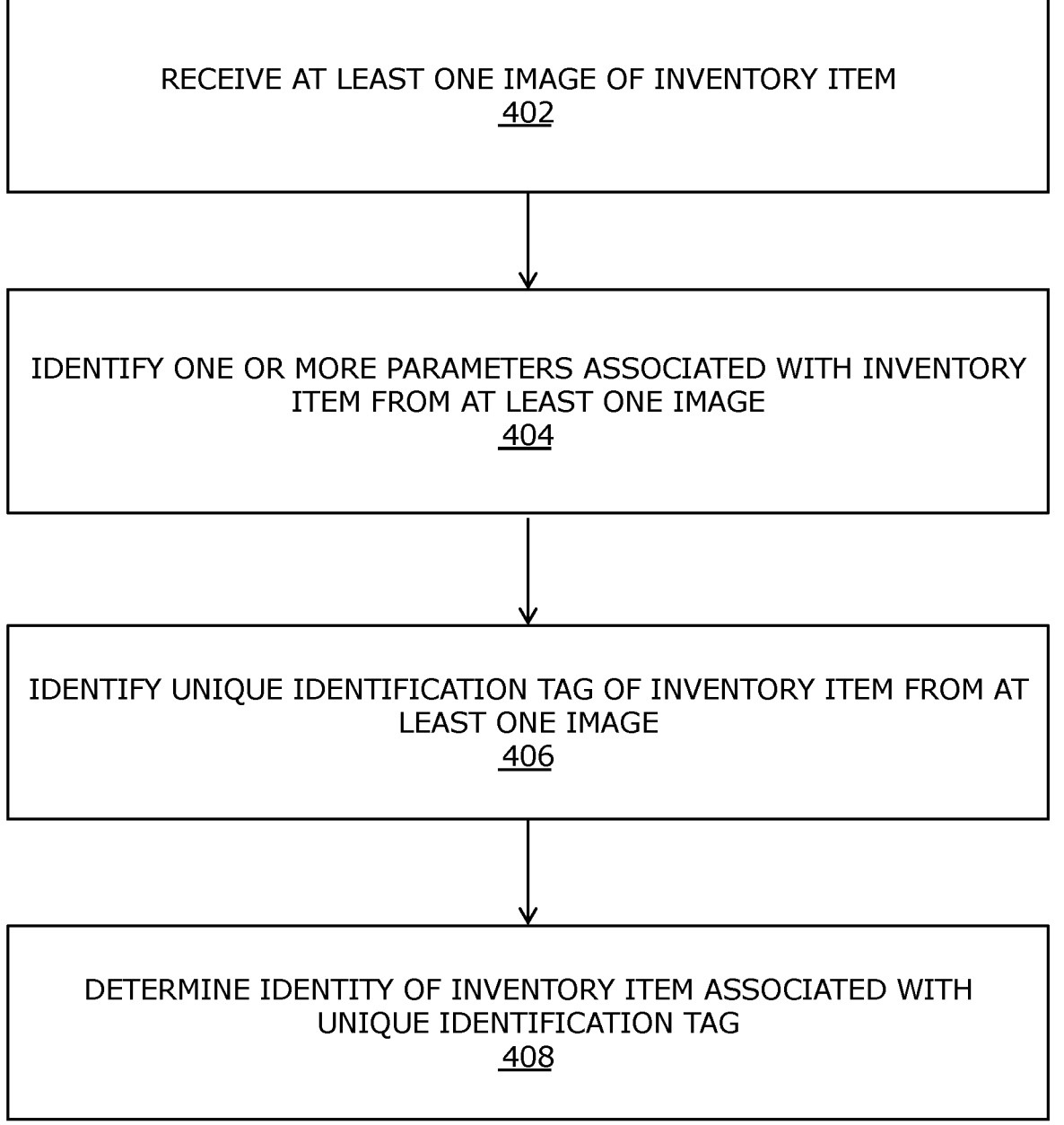
FIG. 4 is an illustration of a flowchart depicting steps of a method for tracking an inventory item within a facility, in accordance with an embodiment of the present disclosure.

Referring to FIG. 4, illustrated is a flowchart depicting steps of a method for tracking an inventory item within a facility, in accordance with an embodiment of the present disclosure. At step 402, at least one image of the inventory item is received, wherein the at least one image comprises a unique identification tag therein. At step 404, one or more parameters associated with the inventory item are identified from the at least one image. At step 406, the unique identification tag of the inventory item is identified from the at least one image. At step 408, an identity of the inventory item associated with the unique identification tag is determined.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for tracking an inventory item within a facility, the system comprising:
   a unique identification tag for the inventory item;
   a plurality of cameras positioned within the facility; and
   an image processor communicably coupled to the plurality of cameras in the facility via a network, configured to, in response to receiving at least one image of the inventory item including the unique identification tag from at least one of the plurality of cameras:
      employ at least one of: computer vision, neural networks, image processing algorithms for processing the at least one image to:
         identify one or more parameters associated with the inventory item from the at least one image, wherein the one or more parameters include at least one of: a type, a class, a state of the inventory item; and
         identify the unique identification tag of the inventory item from the at least one image; and
      determine an identity of the inventory item associated with the unique identification tag,
         wherein the image processor is configured to calculate, using a homographic matrix, a spatial position of the inventory item based on the unique identification tag of the inventory item.

2. The system of claim 1, wherein the image processor is configured to crop the at least one image to bounding box coordinates of the inventory item therein, prior to identifying the unique identification tag of the inventory item.

3. The system of claim 1, wherein the image processor is communicably coupled with a database storing information relating to inventory items and corresponding unique identification tags, wherein the image processor is configured to employ the database for determining the identity of the inventory item associated with the unique identification tag.

4. The system of claim 1, wherein the unique identification tag is generated as a random machine-readable pattern.

5. The system of claim 1, wherein the image processor employs neural networks for processing of the at least one image and the image processor is trained using real images, synthetic images or a combination thereof for identification of one or more parameters associated with the inventory item.

6. The system of claim 1, wherein the image processor is further configured to employ a filter algorithm for collecting data relating to a given unique identification tag from a plurality of consecutive image frames, and extract a legible image of the given unique identification tag therefrom.

7. A method of tracking an inventory item within a facility, the method comprising:
   providing a unique identification tag for the inventory item;
   providing a plurality of cameras positioned within the facility;
   receiving, by an image processor, at least one image of the inventory item, wherein the at least one image comprises a unique identification tag therein, captured by the plurality of cameras, and wherein the image processor is communicably coupled to the plurality of cameras in the facility via a network;
   employing, by the image processor, at least one of: computer vision, neural networks, image processing algorithms for processing the at least one image to:
      identifying, by the image processor, one or more parameters associated with the inventory item from the at least one image, wherein the one or more parameters include at least one of: a type, a class, a state of the inventory item;
      identifying, by the image processor, the unique identification tag of the inventory item from the at least one image;
      determining, by the image processor, an identity of the inventory item associated with the unique identification tag, and
      calculating, by the image processor, a spatial position of the inventory item based on the unique identification tag of the inventory item using a homographic matrix.

8. The method of claim 7, wherein the method comprises cropping the at least one image to bounding box coordinates of the inventory item therein prior to identifying the unique identification tag of the inventory item.

9. The method of claim 7, wherein the unique identification tag is generated as a random machine-readable pattern.

10. The method of claim 7, wherein the method comprises using neural networks for processing of the at least one image and the method comprises training neural networks using real images, synthetic images or a combination thereof for identification of one or more parameters associated with the inventory item.

11. The method of claim 7, wherein the method comprises employing a filter algorithm for collecting data relating to a given unique identification tag from a plurality of consecutive image frames, and extracting a legible image of the given unique identification tag therefrom.

* * * * *